(12) United States Patent
Guan et al.

(10) Patent No.: US 8,422,518 B2
(45) Date of Patent: Apr. 16, 2013

(54) MANAGING TRANSMIT JITTER FOR MULTI-FORMAT DIGITAL AUDIO TRANSMISSION

(75) Inventors: Zhiyong Guan, Shanghai (CN); Xiaoqian Zhang, Shanghai (CN); Qi Li, Shanghai (CN)

(73) Assignee: Integrated Device Technology, inc., San Jose, CA (US)

( * ) Notice: Subject to any disclaimer, the term of this patent is extended or adjusted under 35 U.S.C. 154(b) by 48 days.

(21) Appl. No.: 12/194,080

(22) Filed: Aug. 19, 2008

(65) Prior Publication Data

US 2010/0046557 A1    Feb. 25, 2010

(51) Int. Cl.
*H04J 3/06*       (2006.01)

(52) U.S. Cl.
USPC .......................................... 370/516; 370/510

(58) Field of Classification Search ................ None
See application file for complete search history.

(56) References Cited

U.S. PATENT DOCUMENTS

| | | | |
|---|---|---|---|
| 6,040,870 A * | 3/2000 | Small | 348/476 |
| 6,144,748 A | 11/2000 | Kerns | |
| 7,349,419 B1 * | 3/2008 | Philp | 370/414 |
| 2004/0228326 A1 * | 11/2004 | Pearson | 370/352 |
| 2007/0005794 A1 * | 1/2007 | Graham | 709/231 |
| 2007/0031126 A1 * | 2/2007 | Jung et al. | 386/124 |
| 2007/0081079 A1 * | 4/2007 | Kim et al. | 348/207.99 |
| 2007/0234134 A1 | 10/2007 | Shao et al. | |
| 2008/0152309 A1 * | 6/2008 | Shih et al. | 386/96 |
| 2009/0052471 A1 * | 2/2009 | Pasqualino et al. | 370/493 |
| 2009/0055694 A1 * | 2/2009 | Ramesh et al. | 714/700 |
| 2009/0115911 A1 | 5/2009 | Lida et al. | |
| 2009/0286523 A1 * | 11/2009 | Cotevino et al. | 455/418 |
| 2010/0118760 A1 * | 5/2010 | Xie et al. | 370/312 |
| 2011/0013084 A1 * | 1/2011 | Black | 348/515 |

OTHER PUBLICATIONS

PCT International Search Report and the Written Opinion mailed Oct. 8, 2009, in related International Application No. PCT/US2009/054365.
PCT International Preliminary Report on Patentability mailed Mar. 1, 2012, in related International Application No. PCT/US2009/054365.

* cited by examiner

*Primary Examiner* — Kwang B Yao
*Assistant Examiner* — Jutai Kao
(74) *Attorney, Agent, or Firm* — Haynes and Boone LLP

(57) ABSTRACT

A method of transmitting audio data across a digital interface is provided. The method includes receiving audio data, organized as a plurality of audio samples. At least one of the plurality of audio samples may be placed into a data packet. The data packet may be transmitted during a valid transmission interval if the data packet is full or during a valid transmission interval in response to receiving a packet send event.

18 Claims, 4 Drawing Sheets

MANAGING TRANSMIT JITTER FOR MULTI-FORMAT DIGITAL AUDIO TRANSMISSION

BACKGROUND

1. Technical Field

Embodiments consistent with the present invention are related to a method for transmitting digital audio data and, in particular, a method for transmitting digital audio data in a burst mode consistent with the jitter and bandwidth requirements of multi-format digital interface protocols.

2. Discussion of Related Art

Digital interface standards, such as High-Definition Multimedia Interface™ (HDMI), combine digital video and digital audio data streams into a single physical interface. By providing a single interface, connectivity between systems and devices using HDMI may be simplified because of the reduced number of physical connections. In addition, digital interface standards like HDMI may often provide higher bandwidth connections between devices compared to traditional analog audio/video connections. Accordingly, home entertainment components, gaming systems, personal computers, and portable consumer electronic devices have adopted HDMI interfaces to support the growing demand for access to high-bandwidth media-rich content.

Many of these devices utilize high-definition video and multi-channel digital audio standards to meet the bandwidth requirements to access the increasing availability of media-rich content. HDMI supports several of these standards. For example, HDMI transmits Advanced Television System Committee (ATSC) HDTV standards. In addition, HDMI audio support includes 8 channels up to 192 kHz, uncompressed digital audio, and compressed formats, including Dolby® Digital and DTS® and lossless digital audio formats Dolby® TrueHD and DTS-HD Master Audio™.

In operation, however, supporting multiple combinations of video and audio formats on a single interface can increase the complexity of the data transmission. An HMDI link, for example, can transmit one data type at any given time based on the active operating mode. For example, to transmit audio data, received audio sample data is processed into data packets, delayed, and transmitted when the video data period is inactive. This approach transforms continuous audio data received by the HDMI source encoder into a burst transmission received at the HDMI sink device.

At the HDMI sink device, the burst transmission of audio sample data may be buffered to reduce any noticeable audio problems resulting from the discontinuous data transmission. To minimize audio problems and to reduce the receive buffer size at the HDMI sink device, the HDMI standard has defined a maximum transmission jitter requirement for burst audio data samples. However, because the available audio bandwidth depends on the video format timing, changes to the audio data sample rate may negatively affect the jitter compliance of the transmitted audio data stream. In some cases, a user can configure the average number of audio samples for each audio sample packet transmitted across the HDMI link to meet the bandwidth and jitter requirements for a given video format timing. However, because HDMI is an intermediate interface, user configuration is not desirable nor does it necessarily ensure transmit jitter compliance for each audio sample rate corresponding to a particular video format timing. Accordingly, there is a need for an automated method to transmit audio sample data in a burst mode consistent with the jitter and audio bandwidth requirements of multi-format digital interfaces like HDMI.

SUMMARY

Consistent with the present invention, there is provided a method of transmitting audio data across a digital interface that includes receiving audio data, organized as a plurality of audio samples, placing at least one of the plurality of audio samples into a data packet, and transmitting the data packet during a valid transmission interval if the data packet is full, or transmitting the data packet during a valid transmission interval in response to receiving a packet send event.

It is to be understood that both the foregoing general description and the following detailed description are exemplary and explanatory only and are not restrictive of the invention. Further embodiments and aspects of the invention are described with reference to the accompanying drawings, which are incorporated in and constitute a part of this specification.

DETAILED DESCRIPTION

Reference will now be made in detail to the embodiments consistent with the present invention, examples of which are illustrated in the accompanying drawings. Wherever possible, the same reference numbers will be used throughout the drawings to refer to the same or like parts.

Figure 1:
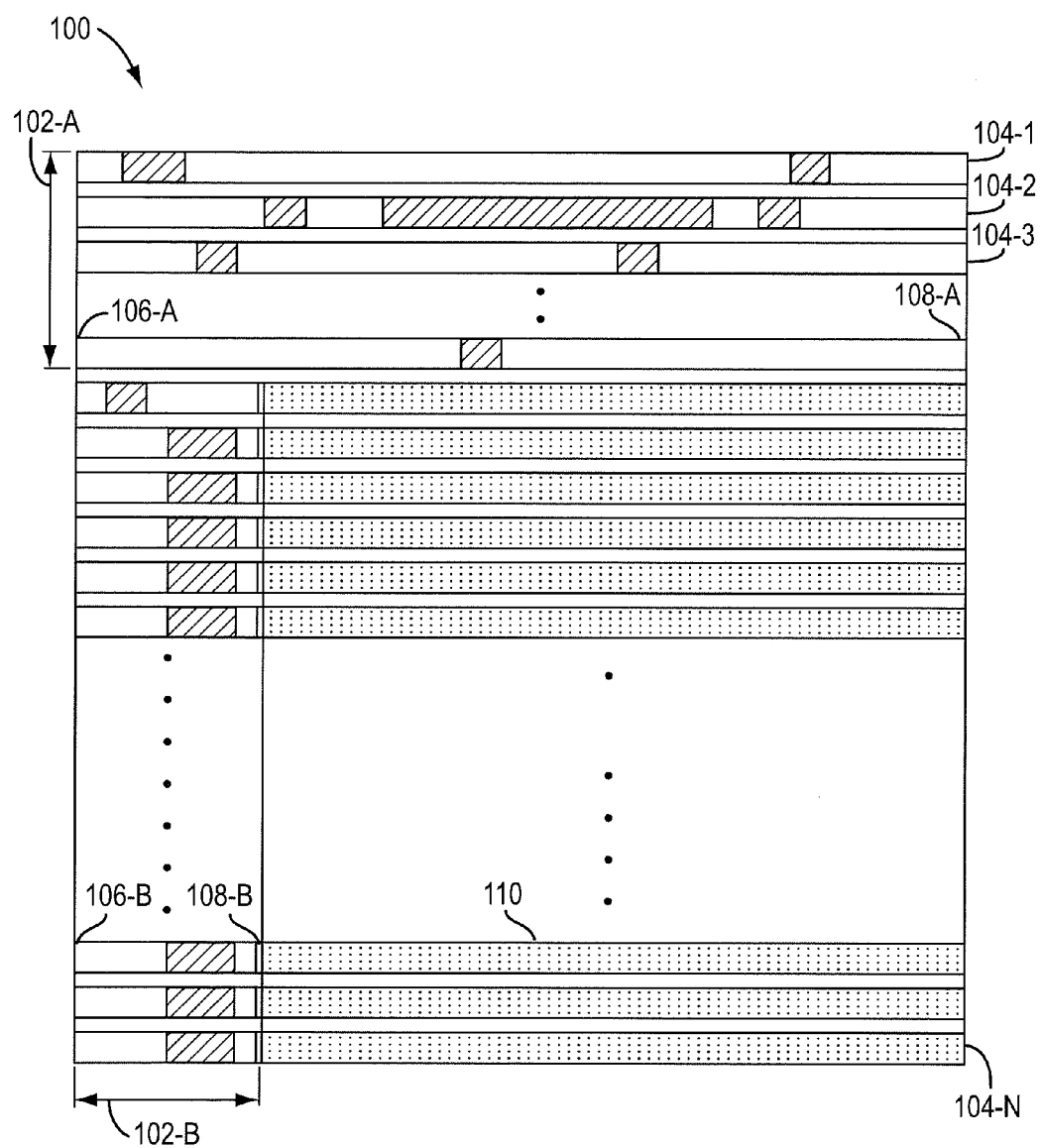
FIG. 1 illustrates an exemplary video frame consistent with embodiments of the present invention.

FIG. 1 illustrates an exemplary video frame 100 consistent with embodiments of the present invention. As shown in FIG. 1, video frame 100 includes multiple horizontal display lines 104-1, 104-2, 104-3, 104-4, 104-5, through 104-n. During each horizontal display line, multiple data types, including video, audio, or control data, may be transmitted. The transmission period of each data type, however, may be limited to specific intervals of video frame 100 or specific portions of a horizontal display line. For example, video data may be transmitted on display lines 104-5 through 104-n during active video interval 110. Active video interval 110 begins at the termination of horizontal blank interval 102-B and ends at the termination of the associated horizontal display line. Audio and control data, however, may be transmitted on any horizontal display line during a valid transmission interval. Consistent with embodiments of the present invention, a valid transmission interval may include vertical blank interval 102-A or horizontal blank interval 102-B. Vertical blank interval 102-A may include video display lines 104-1 through 104-4. The valid transmission interval of each horizontal display line included in vertical blank interval 102-A may span the entire horizontal display line. For example, as shown in FIG. 1, the valid transmission interval begins at 106-A and ends at the end of horizontal display line 108-A. In contrast, a valid transmission interval for horizontal display lines included in horizontal blank interval 102-B may include a portion of the particular horizontal display line. As shown in FIG. 1, during horizontal blank interval 102-B, a valid transmission interval may begin at 106-B and end at the start of active video interval 108-B. Accordingly, the available audio bandwidth for a particular horizontal display line is dependent on the duration of the valid transmission interval.

Figure 2:
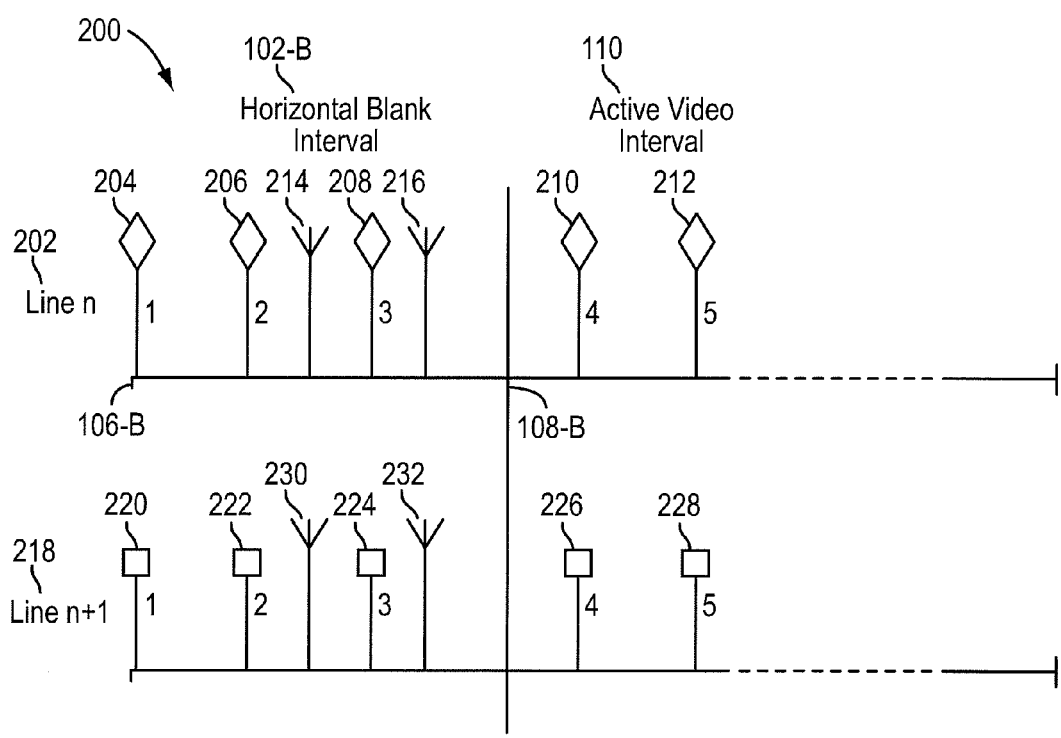
FIG. 2 shows a timing diagram illustrating the timing relationship between audio samples and packet send events consistent with embodiments of the present invention.

FIG. 2 shows a timing diagram 200 illustrating the timing relationship between audio samples and packet send events consistent with embodiments of the present invention. As shown in FIG. 2, a first horizontal display line n 202, receives five audio samples 204, 206, 208, 210, and 212 spread over horizontal blank interval 102-B and active transmission interval 110. As previously discussed, audio data may be transmitted during a valid transmission interval, which includes horizontal blank interval 102-B. During horizontal blank interval 102-B, line n 202 receives audio sample_1 204, audio sample_2 206, and audio sample_3 208. In accordance with aspects of the present invention, audio samples may be transmitted using a data packet having defined size. The data packet size may be based on a specific standard or be user-defined to comply with a proprietary transmission protocol. For example, HDMI specifies that a data packet is 32 clocks long and holds up to four audio samples. The number of data packets that may be transmitted during a valid transmission interval, such as a horizontal blank interval, may also be determined based on a standard or be user-defined to comply with a proprietary transmission protocol. For example, in FIG. 2, the HDMI standard permits the transmission of at most two audio data packets during horizontal blank interval 102-B. Consequently, remaining audio sample_4 210 and audio sample_5 212, will be transmitted during a subsequent horizontal display line.

As shown in FIG. 2, line n+1 218 includes audio sample send indicator_1 220, indicator_2 222, indicator_3 224, indicator_4 226, and indicator_5 228. The relative position of each audio sample send indicator is based on the transmit jitter requirement associated with the audio transmission standard or proprietary protocol requirements. For example, to comply with HDMI audio sample transmit jitter requirements, a received audio sample should be transmitted no later than the same point on the next horizontal display line, as the corresponding audio sample send indicator. Accordingly, audio sample_1 204 received on line n 202 should be transmitted at or prior to audio send indicator_1 220 on line n+1 218. Similarly, audio sample_2 206 through audio sample_5 212, should be transmitted on or before audio send indicator_2 222 through audio send indicator 5 228 on line n+1 218, respectively. As shown in FIG. 2, line n 202 and line n+1 218 include packet send events 214, 216, 230, and 232 to initiate the transmission of audio samples in compliance with HDMI audio sample transmit jitter requirements.

Figure 3:
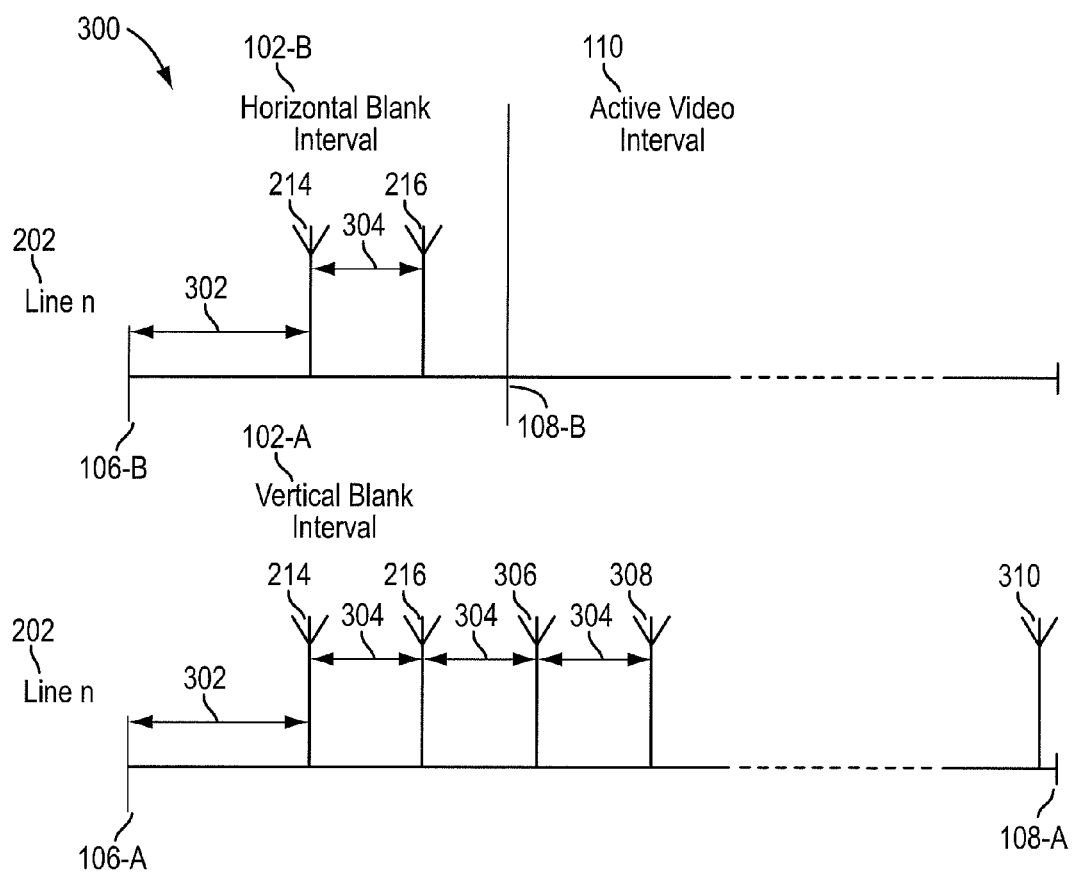
FIG. 3 shows a timing diagram illustrating the generation of packet send events consistent with embodiments of the present invention.

FIG. 3 shows a timing diagram 300 illustrating the generation of packet send events consistent with embodiments of the present invention. As shown in FIG. 3, packet send events are generated periodically during a valid transmission interval to initiate the transmission of a received data packet. During horizontal blank period 102-B, a first packet send event 214 is generated following overhead transmission interval 302. Consistent with embodiments of the present invention, overhead may include a preamble, a guard band, or other protocol specific control information, such as a High-bandwidth Digital Content Protection (HDCP) re-key. After receiving a first packet send event, a first received audio sample may be added to the data packet and transmitted. For example, returning to FIG. 2, after receiving first packet send event 214, audio sample_1 204 and audio sample_2 206 may be placed in a data packet and transmitted.

As shown in FIG. 3, second packet send event 216 is generated after first packet send event 214 at packet send period 304. Consistent with embodiments of the present invention, packet send period 304 may be based on the length of the data packet or the duration of the valid transmission interval. Both factors may be expressed in terms of a specified number of clocks. For example, the HDMI standard specifies that data packets may be 32 pixel clocks long. Thus, for embodiments supporting HDMI audio data transmission, packet send period 304 may set to 32 pixel clocks. In other embodiments, additional packet send events may also be generate after second packet send event 216 based on the duration of the valid transmission interval. For example, during vertical blank interval 102-A, subsequent packet send events 306 and 308 may be generated after second packet send event 216 at a rate equal to packet send period 304. Additional packet send events may be periodically generated in a similar manner until the valid transmission interval terminates. For example, during horizontal blank interval 102-B, packet send event 216 represents the final packet send event prior to the termination of the valid transmission interval indicated by beginning of active transmission interval 108-B. Similarly, during vertical blank interval 102-A, packet send event 310 represents the final packet send event prior to the termination of the valid transmission interval indicated by the end of horizontal display line n 202.

Figure 4:
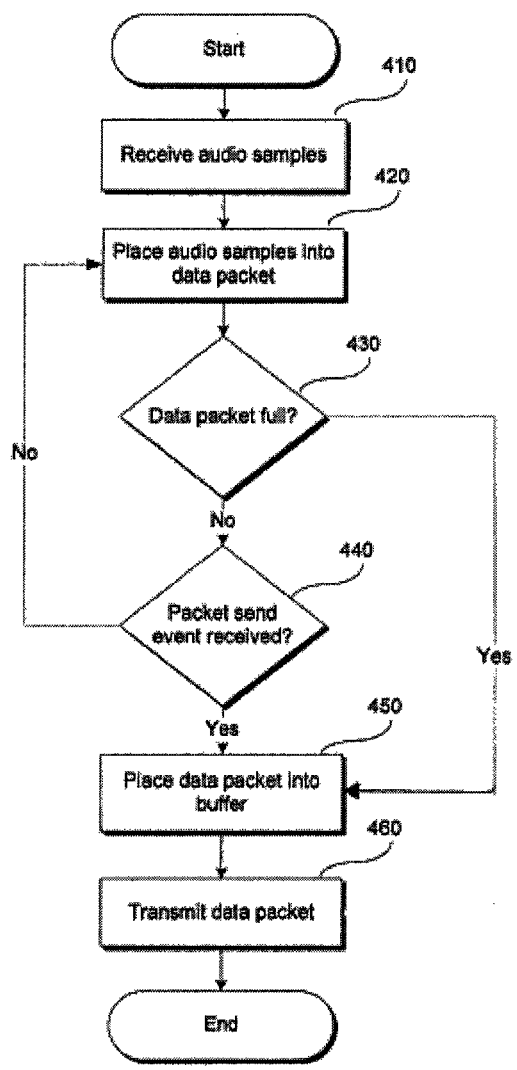
FIG. 4 illustrates a flowchart of steps in an exemplary method for transmitting audio data consistent with embodiments of the present invention.

FIG. 4 illustrates a flowchart of steps 400 in an exemplary method for transmitting audio data across a digital interface consistent with embodiments of the present invention. It will be readily appreciated by one having ordinary skill in the art that the illustrated procedure can be altered to delete steps, move steps, or further include additional steps. In step 410, audio data are received as a continuous data stream. In some embodiments, received audio data is organized as discrete audio samples. Audio samples may be compressed or uncompressed data from a single or multiple sources.

In step 420, received audio samples are placed into an appropriate data packet for transmission. A data packet may include a header and multiple sub-packets, where each sub-packet may contain an audio sample. In some embodiments, audio samples may be placed into data packets based on a determination of whether or not the data packet is full or a packet send event is received, consistent with steps 430 and 440, respectively. For example, if the data packet is not full, a first one of the received audio samples 204 is placed in a data packet. If a first packet send event 214 has not been received, a second audio sample 206 may be placed in the data packet. In some embodiments, this process continues until the data packet is full or a first packet send event 214 occurs, at which point the data packet will be transmitted consistent with step 450. In other words, audio samples are placed in the data packets and transmitted automatically independent of the video format timing or associated audio sample rate.

In step 430, a data packet is analyzed to determine whether the data packet is full. In some embodiments, the determination may be based on user-defined data transmission protocol requirements. In other embodiments, the determination may be based on compliance with recognized industry standards, such as HDMI. For example, in HDMI a data packet is full when the data packet contains four audio samples. Based on a determination that the data packet is full, the data packet may be placed in a transmit buffer consistent with step 450. In cases where the determination indicates that the data packet is not full, a check for the receipt of a packet send event may be performed consistent with step 440.

In step 440, a data stream is analyzed to determine whether a packet send event has been received. In some embodiments, the determination may be performed by one or a combination of hardware, software, or firmware. If a determination is made that a packet send event was not received, an additional received audio sample may be placed in a data packet consistent with step 420. If a determination is made that a packet send event was received, audio samples received prior to the receipt of the packet send event may be placed in a transmit buffer consistent with step 450. Accordingly, a partially filled data packet may be placed in the transmit buffer.

In step 450, a full or partially filled data packet may be placed in a transmit buffer until the occurrence of a valid transmission interval. For example, audio samples received during an active video interval may be sufficient to fill a data packet. In this case, the filled data packet may be stored in a transmit buffer until a valid transmission interval occurs. A valid transmission interval may include a horizontal or a vertical blank interval.

In step 460, data packets may be transmitted during valid transmission interval of a horizontal display line. In some embodiments, a valid transmission window may be identified by the beginning of either a vertical blank interval or a horizontal blank interval. Following the identification of the beginning of the valid transmission interval, overhead data may be transmitted. In some embodiments, overhead data may include a preamble, a guard band or other protocol specific control information, such as a HDCP re-key. Following the transmission of the overhead data, received data packets may be transmitted if either the data packet is full or after a packet send event as described in step 440. For example, in some embodiments a data packet may be full prior to the beginning of a valid transmission interval, resulting from audio samples received during an active transmission interval 110 of a previous horizontal display line. In these cases, the full data packet may be transmitted immediately following the overhead data and prior to the generation of the first packet send event 214. In other embodiments, a data packet send event occurs prior to transmitting the data packet to facilitate transmit jitter compliance. Here, a first data packet send event 214 may be generated upon completion of the overhead data transmission. Subsequent packet send events, such as packet send events 216, 306, and 308 through 310, may be periodically generated at a rate sufficient to meet the bandwidth and transmit jitter requirements of the audio data stream. For example, the rate may be configured to be equal to the packet size. As a result, each packet send event triggers the transmission of a data packet when the data packet can hold its maximum number of audio samples.

Other embodiments consistent with the present invention will be apparent to those skilled in the art from consideration of the specification and practice of the invention disclosed herein. It is intended that the specification and examples be considered as exemplary only. Accordingly, the invention should only be limited by the following claims.

What is claimed is:

1. A method of transmitting multi-media data from a multi-media digital communication device, the method comprising:
    receiving the multi-media data via an input digital interface of the digital communication device, the multi-media data including digital audio data and digital video data in a digital video frame;
    identifying the digital audio data in the digital video frame, the digital audio data comprising a sequence of audio samples and audio send indicators, each audio sample associated with an audio send indicator;
    placing each audio send indicator in a relative position to each other, according to a transmit jitter associated with the audio transmission;
    placing at least one of the plurality of digital audio samples into a data packet;
    selecting a valid transmission interval for the data packet;
    transmitting each audio sample within the valid transmission interval; and
    transmitting each audio sample no later than the audio send indicator associated therewith.

2. The method of claim 1, wherein placing at least one of the plurality of digital audio samples into the data packet comprises:
    determining if the data packet is full; and
    placing a first one of the plurality of digital audio samples in the data packet based on a determination that the data packet is not full.

3. The method of claim 2, wherein determining if the data packet is full is based on user-defined data transmission protocol requirements.

4. The method of claim 2, wherein determining if the data packet is full is based on compliance with recognized industry standards.

5. The method of claim 1, wherein the data packet includes a digital audio sample packet, having a header and a plurality of sub-packets.

6. The method of claim 1, wherein the valid transmission interval comprises at least one of a vertical blank interval and a horizontal blank interval of the digital video frame.

7. The method of claim 1, wherein the packet send event includes periodic signal operable during at least one of a vertical blank interval and a horizontal blank interval of the digital video frame.

8. The method of claim 1, wherein transmitting each audio sample occurs prior to an audio send indicator associated with the at least one of the plurality of digital audio samples placed into the data packet.

9. The method of claim 1, wherein the digital video frame comprises a plurality of horizontal display lines; and
    placing the audio send indicator comprises placing the audio send indicator at the same point relative to the audio signal associated therewith in a next horizontal display line.

10. The method of claim 1, wherein transmitting the data packet further comprises:
    identifying a start of the valid transmission interval;
    transmitting overhead data after the start of the valid transmission interval;
    sending a first packet send event following a transmission of overhead data;
    sending a second packet send event at a predetermined period following the first packet send event; and
    sending a final packet send event at a termination of the valid transmission interval.

11. The method of claim 10, wherein the predetermined period following the first packet send event is a fixed number of pixel clocks.

12. The method of claim 10, wherein the termination of the valid transmission interval comprises at least one of:
    the start of an active interval; and
    the termination of a horizontal display line.

13. The method of claim 10, wherein the overhead data comprises at least one of:
    a preamble;
    a guard band; and
    a High-Bandwidth Digital Content Protection re-key.

14. The method of claim 2, wherein placing at least one of the plurality of digital audio samples into the data packet further comprises:
    placing a second one of the plurality of digital audio samples in the data packet when a first packet send event has not yet been received.

15. The method of claim 14, wherein placing at least one of the plurality of digital audio samples into the data packet further comprises:
   continuing to place the plurality of digital audio samples in the data packet until the data packet is full or until a first packet send event is received.

16. The method of claim 1, wherein placing at least one of the plurality of digital audio samples into the data packet comprises:
   determining if the data packet is full; and
   checking for the receipt of a packet send event when it is determined that the data packet is not full.

17. The method of claim 16, wherein said step of checking for the receipt is performed by one or a combination of hardware, software or firmware.

18. The method of claim 16, wherein audio samples received prior to the receipt of a packet send event are placed in a transmit buffer when it is determined that the packet send event has been received.

* * * * *